United States Patent
Nielsen et al.

(10) Patent No.: US 9,416,769 B2
(45) Date of Patent: Aug. 16, 2016

(54) METHOD TO CONTROL THE OPERATION OF A WIND TURBINE

(75) Inventors: Kaj Skov Nielsen, Issaquah, WA (US); Tony Stokholm, Skanderborg (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1090 days.

(21) Appl. No.: 13/222,196

(22) Filed: Aug. 31, 2011

(65) Prior Publication Data
US 2013/0052010 A1   Feb. 28, 2013

(51) Int. Cl.
*F03D 7/00* (2006.01)
*F03D 7/02* (2006.01)
*F03D 7/04* (2006.01)

(52) U.S. Cl.
CPC *F03D 7/02* (2013.01); *F03D 7/042* (2013.01); *F03D 7/048* (2013.01); *Y02E 10/723* (2013.01)

(58) Field of Classification Search
CPC ...... F05B 2260/63; F03D 7/042; F03D 7/048
USPC ........................................................ 415/121.2
See application file for complete search history.

(56) References Cited

U.S. PATENT DOCUMENTS

| | | | |
|---|---|---|---|
| 8,379,486 B2 * | 2/2013 | Adler et al. | 367/136 |
| 8,502,730 B2 * | 8/2013 | Roche | 342/61 |
| 2005/0162978 A1 | 7/2005 | Lima | |
| 2009/0185900 A1 * | 7/2009 | Hirakata et al. | 416/1 |

FOREIGN PATENT DOCUMENTS

| | | |
|---|---|---|
| DE | 102005046860 A1 | 4/2007 |
| DE | 102007004027 | 7/2008 |
| DE | 102007004027 A1 | 7/2008 |
| EP | 2017470 A1 | 1/2009 |
| JP | 2009228554 | 10/2009 |
| JP | 2009228554 A | 10/2009 |
| WO | WO 2010076500 A1 | 7/2010 |

* cited by examiner

*Primary Examiner* — Igor Kershteyn

(57) ABSTRACT

A method to control the operation of a wind turbine is provided. According to the method a sound of a bat in the area of the wind turbine is detected. According to the detected sound of the bat in the area of the wind turbine a parameter for the operation of the wind turbine is set.

18 Claims, 1 Drawing Sheet

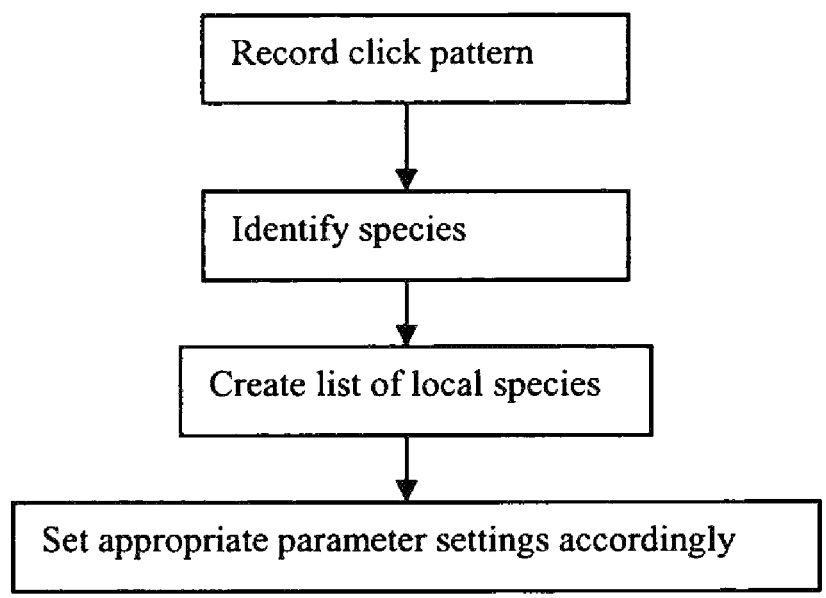

METHOD TO CONTROL THE OPERATION OF A WIND TURBINE

FIELD OF INVENTION

The invention describes a method to avoid damages of bats in the vicinity of a wind turbine.

BACKGROUND OF INVENTION

Observations in the vicinity of wind turbines show, that bats may be killed or injured by wind turbines in operation.

According to investigations there are two ways to injure or cause the death of a bat by a wind turbine.

The first one is that there is a direct collision of the bat with a blade of the wind turbine, when the rotor of the wind turbine is in operation.

The second one is that moving wind turbine blades cause high pressure differences in the surrounding area of the turning blades. Those air pressure differences might cause internal injuries to the bat, e.g. the lungs of the bat may be hurt if the bat passes by.

Thus the direct impact of the turning blade and/or the caused pressure differences of the turning blade may be fatal for the bat.

There are specific bat-species which are endangered in a lot of countries. They are recorded and monitored by help of a so called "red list". The protection of theses bats is very important even due to their low reproduction rate. In some countries, like the USA, the protection of bats is even a legal requirement.

It is known to stop the rotation of wind turbines in specific time periods to save the bats. It is also known to stop the rotation of the turning blades of the wind turbine if a flying object is approaching towards the wind turbine. For example flying objects are detected by help of radar or by optical detection means.

Document EP 2017470 A1 discloses a wind power generation device capable of reducing collision of a flying object against a blade or bird strike. The wind power generation device includes a tower and a nacelle, which is fixed to the tower. Blades are connected via a hub with the nacelle. An obstacle search device is capable to detect a flying object in front of the wind turbine or on the windward side of the wind turbine. A blade angle controller is used to control a change in the blade-angle. It is even used to stop the rotation of the blades. The obstacle search device searches for the flying object in a continuous manner. If the flying object is detected to approach the wind turbine the blade angle controller changes the blade-angles to stop the rotation.

As a consequence the wind turbine is always stopped when a flying object is detected in the vicinity of the wind turbine. Thus a loss in the energy production is caused.

It is known to scare away flying animals by noise. For example bangs are used for this purpose or even cries of birds of prey. But this solution does not work for nocturnal bats as birds of prey show their main-activity by day. Additionally birds of prey do not hunt bats thus the bats in turn are not scared by birds of prey.

Last but not least the bats are disturbed in their natural behavior by any kind of scare-of-noise. Even a high level of noise might disturb other animals that are not exposed to the effects of the wind turbine.

SUMMARY OF INVENTION

A method to control a wind turbine to avoid damages of bats while the energy production of the wind turbine is optimized in view to the presence of bats is disclosed.

According to the method, a sound of a bat in the area of the wind turbine is detected. According to the detected sound of the bat in the area of the wind turbine a parameter for the operation of the wind turbine is set.

Thus the operation of the wind turbine is only controlled and thus only influenced if a bat is present in the area of the wind turbine. The turning blades of the wind turbine are stopped in this case or their rotational speed is changed if a bat is present. Thus the energy-production is optimized in view to the presence of bats.

In turn the injury of bats, which passes by the acting wind turbine blades, is avoided or is at least reduced.

It is not necessary to scare off the bats from the wind turbine as the operation of the wind turbine is controlled. Thus the natural behavior of bats in the ambience of the wind turbine is not influenced. Even other animals are not disturbed by the method invented as no acoustic signals are emitted.

Bats emit a pattern of mostly clicking sound in the ultrasound spectrum. The sound differs form one bat-species to the other. The sound even varies if the bat is foraging or migrating or resting. Thus different sounds are used for their different behavioral patterns.

The sound of the bat may be detected by help of a microphone, which is capable to handle ultrasound signals.

In one embodiment the detection system is located at the wind turbine, e.g. at the hub, the nacelle, the tower or asides the blade.

In another embodiment the detection system is installed in the vicinity of the wind turbine. For example a mast, being used for meteorological measurements or a separate construction is used to arrange the detection system.

The sound of the bat may be detected at a first wind turbine, while the operation of a second wind turbine is controlled additionally by the gathered information asides the first wind turbine.

In one embodiment the parameter for the operation of the wind turbine is a stop signal for the turning blades. It is even possible to activate a brake by the parameter or to influence the pitch angle of the rotor blades or to control the yaw-system of the turbine by the parameter.

The sound detected may be analyzed to identify a species of the bat and/or to identify a specific behavioral pattern of the bat. The parameter for the operation of the wind turbine is set according to the presence of the specific species of the bat and/or the specific behavioral pattern of the bat.

In one embodiment the operation of the wind turbine is only controlled or influenced when an endangered species of bat is detected or if a bat-species with a high harm exposure is detected.

Thus the energy production is only altered if a specific bat-species is present in the area.

The operation of the wind turbine is influenced in dependency of the specific behavioral pattern of the detected bat.

The different behavioral pattern refers to the fact that the bat is foraging, migrating or resting for example. Thus the risk for the bat-damage depends on the behavior of the bat. The risk is lower if the bat is resting. The risk is higher if the bat is migrating or foraging.

Thus the wind turbine needs to be controlled only if there is a certain probability for the bat to be hit due to its behavioral pattern. Thus the operation of the wind turbine only needs to be controlled when the bat shows a certain behavioral pattern. Thus the species and the behavioral pattern of the species are identified.

Different bats emit different sounds depending on their behavioral pattern. Thus the relevant bat-species and the relevant sound emitted by the bats are preferably saved within a data base or library. The method invented uses this information to align the wind turbine operation accordingly.

The identification of the species of a bat or the behavioral pattern can be done by a bat-specialist. The bat-specialist observes the behavior of the bats and evaluates the risk for the species. The specialist sets up a sound-library for example, which combines the sound of a bat-species with the risk of damage for the bat-species.

The control of the wind turbine is preferably handled according to this library.

The detected sound may be compared with a library of sounds to identify the species of the bat and/or to identify the specific behavioral pattern of the bat.

The sound-library may be stored in the control system of the wind turbine. The sound of the bat may be analyzed in an automated way to identify the bat-species. The risk for the damage of the bat may be evaluated according to the library.

The sound-library may include suitable control commands for the wind turbine. Thus according to the sound-library the wind turbine may be controlled automatically in reference to the detected bat-species.

Thus the presence of a specialist is not needed during the operation of the wind turbine.

The result of the identification of the species and/or the behavioral pattern may be stored in a file for later examination. So the quantity of bats of a specific species and/or their behavior can be studied. Thus the knowledge about bats and the evaluation of the risk for the bat can be improved.

The parameter may be set according to the time of day. The activity of a bat is limited to a certain time of the day. Thus the wind turbine only has to be controlled according to the method invented in a certain time of the day. Thus the misinterpretation of an ambient sound as a bat sound and the influence on the operation of the wind turbine due to that misinterpretation can be avoided in the time of the day when the bats are inactive.

The parameter for the operation may be set when the time of day is between dusk and dawn. Bats are active between dusk and dawn. The control of the operation of the wind turbine according to the claimed method can be limited to the time between dusk and dawn.

Thus the control of the operation of the wind turbine between dawn and dusk due to a signal erroneously detected as the signal of a bat can be avoided. Thus a loss in energy production can be avoided.

The parameter may set according to weather conditions. The activity of bats depends on the wind speed, the direction of the wind, the air pressure and the presence of rain. Bats fly in calm conditions up to a certain wind speed. Thus the operation of the wind turbine only has to be controlled according to the method up to a predefined wind speed. Above a certain wind-speed bats of a certain species of bats don't fly.

The flying altitude of a bat depends on the air pressure. The risk of danger from a wind turbine depends on the flying altitude of the bat. Thus if the bats fly to low to be affected by the wind turbine, the operation of the wind turbine don't has to be influenced even if sounds of the bats are detected in the environment of the wind turbine.

Certain species of bats might not fly in certain weather conditions like rainy weather. Thus in those weather conditions the operation of the wind turbine don't has to be influenced.

Certain species of bats tend to change their behavioral pattern when the air pressure is dropping. Some species begin to migrate for example. Thus the operation of the wind turbine has to be controlled in a different way when the air pressure is dropping.

The control of the wind turbine depends on the direction of the wind and the route of migrating bats. The direction of the wind defines the direction of the rotor (known as "yawing") of the wind turbine.

The possibility of damaging the bat depends on the specific angle between the plane of the rotor and the direction of the migrating bats. Thus the control of the wind turbine depends on the behavioral pattern of a specific species of a bat and the wind direction, which is part of the weather conditions at the wind turbine site.

Thus the influence on the control of the operation of the wind turbine according to the claimed method is limited to weather conditions in which there is a risk of bat-damage or injuries. Thus the loss in power production due to the detecting of a sound of a bat is minimized.

The parameter may be set according to a site condition at the site, where the wind turbine is erected. Bats show a behavior that varies according to the conditions met in a certain site.

The foraging behavior of the bats depends on the presence of insects and so on the presence and type of vegetation in the area of hunting. Thus the control of the operation of the wind turbine according to the method claimed depends on the vegetation close to the wind turbine site.

The behavioral pattern of a bat, like the flying altitude or the selection of a resting place depends on the surrounding terrain in the area of a wind turbine. Thus the behavior of the bat is different when the wind turbine is located in a hilly or mountainous terrain or in a flat area.

Thus the conditions on the site of the wind turbine have to be observed. Thus the operation of the wind turbine according to the method invented depends on the conditions met at the site of the wind turbine.

The parameter may set according to an illumination which is present at the wind turbine site, like e.g. moonlight-illumination or air-traffic-warning-light-illumination or illumination by electric lighting.

Bats feed on insects and insects are attracted by light. So the attendance of bats at a certain place depends on the illumination there. More insects and thus more bats will fly in nights with a higher illumination by the moon for example. Even local cloudiness of the sky in the vicinity of the wind turbine may be considered in addition.

Thus the control of the wind turbine according to the method invented is done in dependency of the moonlight-illumination, originated by the moon-phase and the local visibility of the moon for example.

The presence of insects and thus the foraging behavior of the bats depend on the illumination in the vicinity of the wind turbine.

Illumination in the area of the wind turbine is for example the illumination in an industrial area close to the wind turbine, street lights, illumination on the ground around the wind turbine, the headlights of cars on a road with high traffic density close to the wind turbine.

Insects are attracted by light and prefer the surrounding of a highly illuminated area. Some illumination conditions change during the time of activity of the bats, as street lamps and the illumination in an industrial might be switched of during the night. Also the traffic density on a road varies during the night.

To optimize energy production the influence on the operation of the wind turbine can be reduced when the majority of the insects are drawn to a well lit place and away from the wind turbine. Thus the bats will hunt in the well lit area where the insects are. Thus the control of the wind turbine according to the method invented depends on the surrounding illumination in the area of the wind turbine.

The parameter may be set according to a specific geographical position of the wind turbine site and/or is set according to a specific time in the year.

The existence and behavior of certain species of bats vary in dependency of the geographical position.

There are different species in different parts of the world. In the tropics the bats are active during the whole year while there is no activity of bats in the polar region.

Thus the control of the wind turbine according to the one embodiment is done depending on the geographical position of the wind turbine.

In the area between the tropics and the polar region the activity of the bats changes with the time of the year, the seasons for example.

In most parts of Europe the activity of the bats starts in spring and end in autumn, for example.

Thus the activity of the bats not only depends on the geographical position but also on the time of the year, e.g. the seasons.

The seasons can appear different or begin at a different time due to the influence of a coast or in the middle of a continent. Thus the activity of the bats might start earlier in the year or last longer in a certain geographical region.

The seasons are different in different geographical latitudes, for example on the southern hemisphere the seasons are deferred by 6 months compared to the seasons in the northern hemisphere.

Thus the hemisphere and the specific region need to be considered, too.

Thus the control of the operation of the wind turbine according to the claimed method is just necessary when the bats are active in the area of the wind turbine. Thus it is only necessary in a certain time in the year and/or in a certain geographical position.

Thus the influence on the production of energy can be minimized when the method is limited according to the time in the year and/or the geographical position of the wind turbine.

The parameter may be a control-parameter, which is used to control the rotational speed of the rotor of the wind turbine.

Thus the speed of the rotor of the wind turbine can be set to a lower level if bats are detected. Thus a drop of the air pressure, which is dangerous for bats, is avoided in the area of the rotor blades. Thus it is not dangerous for a bat passing a rotor blade.

The control-parameter may be set in a way that the rotation of the wind turbine rotor is slowed down or stopped.

When the wind turbine rotor is stopped there is no danger for the bats. There is no pressure drop in the vicinity of the rotor and there is no danger of a rotor blade hitting a bat.

Thus the protection of bats is optimized. Thus the wind turbine can also be erected in areas where bats are active that are endangered.

The control-parameter may be set in a way that the rotor of the wind turbine idles.

When the rotor of a wind turbine idles the velocity of the wind turbine rotor is very low. There is nearly no pressure drop in the vicinity of a rotor blade of an idling rotor. Thus the bats are not affected by the pressure drop when they fly in the area of the rotor blade.

When the turbine idles, the turbine can be started again more easily when the bat has left the area of the wind turbine. Thus the energy production can start again easier. Thus the loss of energy production is reduced, while the bats are saved.

The control-parameter may be set in a way that the pitch angle of the rotor blades is changed.

When the pitch angle of the rotor blade is changed the blade comes closer to a stall position. The pressure drop present in the vicinity of the rotor blade is reduced; in addition the rotor looses speed. Thus the danger for the bat is reduced prompt with one measure.

The turbine doesn't have to be stopped completely. It may return to normal operation of the wind turbine quite quickly after the bat has left the area of the wind turbine.

Thus there is only an insignificant reduction in the energy production of the wind turbine.

The sound of the bat in the area of the wind turbine and the specific conditions, which are used to set the parameters, may be monitored over time to decide if the turbine is allowed to return to normal-mode-operation.

The wind turbine continues with the normal operation if the bat has left the area of the wind turbine or if the conditions have changed in a way that the risk for bat-damages is reduced.

A continuous observation is necessary as the bats can enter and leave the area repeatedly and also as the conditions can change constantly. The control system of the turbine can restart the turbine or go back to normal operation mode as soon as the danger for the bats is low enough.

Thus no action of a remote operator is needed when the wind turbine is ready to go back to normal operation.

Thus the effect on the energy production of the wind turbine is minimized and the protection of the bats is optimized.

The parameter may be used to control the operation of at least two wind turbines of a wind park.

In a wind park with two or more wind turbine, several wind turbines might be affected by bats flying through the area. In the case of migrating bats the bats might fly through the wind park meeting more then one wind turbine. A wind turbine needs a certain time to detect the sound of a bat and control the operation. In the case of a wind turbine it is useful to send a pre-warning signal from the turbine, which detects a bat, to neighbor turbines.

As the detection system can also be located at a mast and thus independent of the turbines of a wind-farm for example, generated parameters, based on the detection of a bat, can be used to control two or more wind turbines.

Thus the protection of the bats can be optimized in that a parameter, used to control the operation at least a second wind turbine, is set before the bat reaches the turbine. Thus the amount of additional equipment used can be reduced.

BRIEF DESCRIPTION OF THE DRAWINGS

An aspect of the invention is shown in more detail by help of a FIGURE.

The FIGURE shows a preferred configuration and does not limit the scope of the invention.

DETAILED DESCRIPTION OF INVENTION

FIG. 1 shows the method invented by help of a block diagram.

According to the block diagram a list of parameter settings to control the wind turbine is created.

The first step is illustrated in the first block. In the first block the click pattern, which is part of the sound of the bat, is recorded. The result of this block is the input for the second block.

In the second block the second step is illustrated. In this block the species of the bat is identified. The result of this block is the input for the third block.

The third block illustrates the third step in the method. In this step a list of local species of bats is created and compared with the identified species.

The result of this block is the input of the next and fourth block.

The fourth block illustrates the fourth step of the method. In this step the parameter settings are set appropriate as described above.

The invention claimed is:

1. A method to control the operation of a wind turbine, comprising:
    detecting a sound of a bat in an area of the wind turbine;
    analyzing the sound detected to identify a species of the bat by comparing the detected sound with a database of sounds in order to identify the species of the bat; and
    in response to the identified species, automatically setting a parameter from a control system of the wind turbine for operation of the wind turbine according to the identified species of the bat in the area of the wind turbine;
    wherein the parameter is a control-parameter, which is used to control the rotational speed of the rotor of the wind turbine.

2. The method according to claim 1, further comprising:
    analyzing the sound detected to further identify a specific behavioral pattern of the bat, wherein the parameter for the operation of the wind turbine is set according to the presence of the identified species of the bat and also the specific behavioral pattern of the bat.

3. The method according to claim 1, wherein the parameter is further set according to the time of day.

4. The method according to claim 3, wherein the parameter for the operation is further set when the time of day is between dusk and dawn.

5. The method according to claim 1, wherein the parameter is further set according to weather conditions.

6. The method according to claim 1, wherein the parameter is further set according to a site condition at the site where the wind turbine is erected.

7. The method according to claim 1, wherein the parameter is further set according to an illumination which is present at the wind turbine site.

8. The method according to claim 1, wherein the parameter is further set according to a specific geographical position of the wind turbine site and/or is set according to a specific time in the year.

9. The method according to claim 1, wherein the control-parameter is set in a way that the rotation of the wind turbine rotor is slowed down or stopped.

10. The method according to claim 1, wherein the control-parameter is set in a way that the rotor of the wind turbine idles.

11. The method according to claim 1, wherein the control-parameter is set in a way that the pitch angle of the rotor blades is changed.

12. The method according to claim 1, wherein the sound of the bat in the area of the wind turbine and specific conditions, which are used to set the parameters, are monitored over time to decide if the turbine is allowed to return to normal-mode-operation.

13. The method according to claim 1, wherein the parameter is used to control the operation of at least two wind turbines of a wind park.

14. The method according to claim 1, wherein the parameter is further set according to at least one of the conditions selected from the group consisting of: presence of a behavioral pattern of the bat, time of day, site condition at the site where the wind turbine is erected, weather condition at the site, illumination present at the wind turbine site, geographical position of the wind turbine site, and time of the year.

15. The method according to claim 14, wherein the setting of the parameter results in at least one of the actions selected from the group consisting of: slowing a rotation of the wind turbine rotor, stopping the rotation of the wind turbine rotor, idling the rotor of the wind turbine, and changing the pitch angle of at least one rotor blade.

16. The method according to claim 1, further comprising operating the wind turbine with the parameter.

17. The method according to claim 1, wherein the detecting is done by a detection system located on at least one of a tower, hub, nacelle, or blade of the wind turbine.

18. A method to control the operation of a wind turbine, comprising:
    detecting a sound of a bat in an area of the wind turbine;
    analyzing the sound detected to identify a species of the bat by comparing the detected sound with a database of sounds in order to identify the species of the bat; and
    in response to the indentified species, automatically setting a parameter from a control system of the wind turbine for operation of the wind turbine according to the identified species of the bat in the area of the wind turbine;
    wherein the parameter is further set according to at least one of the conditions selected from the group consisting of: presence of a behavioral pattern of the bat, time of day, site condition at the site where the wind turbine is erected, weather condition at the site, illumination present at the wind turbine site, geographical position of the wind turbine site, and time of the year; and
    wherein the setting of the parameter results in at least one of the actions selected from the group consisting of: slowing a rotation of the wind turbine rotor, stopping the rotation of the wind turbine rotor, idling the rotor of the wind turbine, and changing the pitch angle of at least one rotor blade.

* * * * *